March 10, 1942.  B. C. PLACE  2,275,553
FASTENER
Filed March 22, 1939  2 Sheets-Sheet 1
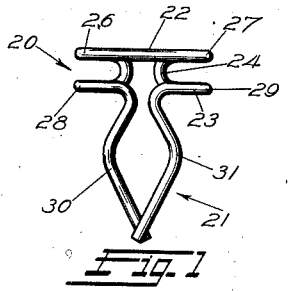
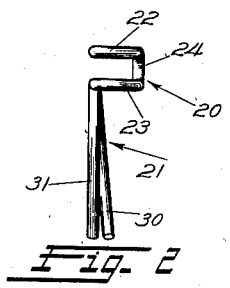
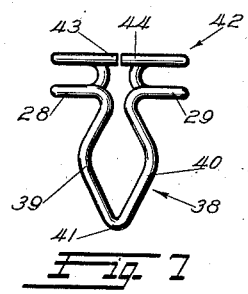
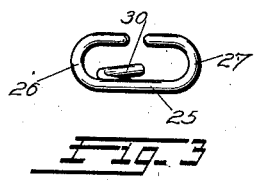
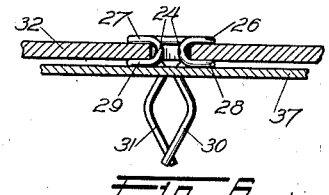
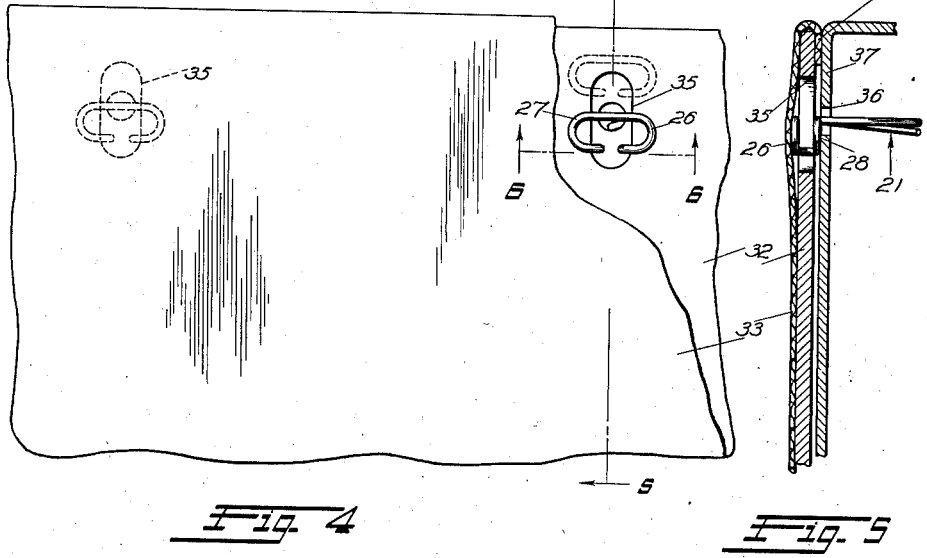
Inventor
Bion C. Place
By Strauch & Hoffman
Attorneys March 10, 1942.  B. C. PLACE  2,275,553
FASTENER
Filed March 22, 1939    2 Sheets-Sheet 2

Inventor
Bion C. Place
By Strauch & Hoffman
Attorneys

Patented Mar. 10, 1942

2,275,553

UNITED STATES PATENT OFFICE 2,275,553

FASTENER

Bion C. Place, Detroit, Mich., assignor of one-half to George E. Gagnier, Detroit, Mich.

Application March 22, 1939, Serial No. 263,550

7 Claims. (Cl. 45—138)

The present invention is concerned with a spring stud fastener intended particularly to secure upholstered or the like trim panels to the interior of automobile or similar bodies. More particularly, the invention concerns a fastener of the so-called hook-on type designed so as to permit a wide range of adjustment of the fastener with respect to the trim panel without in any manner impairing the hold of the fastener on the trim panel foundation.

Fasteners, heretofore used to secure trim panels, of the type that hook on the foundation have been designed so as to grip the foundation between arms of relatively narrow width which arms have extended toward the margin of the panel. Such arrangement has gone into wide use and is entirely satisfactory unless, as is sometimes the case, the spacing of the fastener receiving openings in the supporting structure from the margins of the trim panel varies substantially necessitating a shifting of the fastener with respect to the foundation of the panel in order to permit the stud part thereof to be brought in alignment with the opening provided to receive it.

In situations in which the wide variation just referred to occurs when the hook-on fastener is shifted, a partial disengagement of the hook-like head from the foundation occurs and an inadequate securement of the panel results.

Furthermore, in many cases involving hook-on fasteners of the type in which the arms of the hook extend toward the margins of the panel, said arms have been of such limited width that they engage only a small area of the foundation measured lengthwise of the adjacent margin making it necessary to use fasteners relatively closely spaced in order to adequately secure the panel in place.

The principal purpose of the present invention is to provide an improved hook-head fastener capable of being used in situations in which the location of the apertures in the supporting structure varies widely without impairing the grip of the fastener on the panel foundation and to provide a fastener of the hook-on type that engages a substantial area of the foundation measured lengthwise of the margin to overcome the drawbacks just referred to.

Another object of the invention is to provide an improved spring stud fastener designed so as to be capable of association with a slotted trim panel foundation in a manner providing a gripping of the foundation at opposite sides of the slot and a substantial degree of adjustment of the fastener lengthwise of the slot without impairing in any manner the connection of the fastener to the foundation.

A still further object of the invention is to provide an improved spring stud fastener constructed of wire and having a head part shaped to provide a hooked engagement with the foundation and at the same time provide two pairs of jaws spaced transversely of the arms constituting the hook-like head.

A still further object of the invention is to provide a spring stud fastener constructed of sheet metal and capable of use in the attainment of the advantages already described.

A still further object of the invention is to provide an improved combination of trim panel foundation and spring stud fastener that will permit a substantial shifting of the fastener with respect to the foundation and at the same time provide an adequate support for the fastener that will maintain the protruding stud part substantially normal to the plane of the foundation without capability of movement in any undesired direction.

Still further object of the invention will appear as the description thereof proceeds with reference to the accompanying drawings in which:

Figure 1 is a side view of a wire fastener made in accordance with the present invention;

Figure 2 is an edge view of said fastener;

Figure 3 is a top plan view of the same fastener;

Figure 4 is a fragmentary elevational view showing how the fastener of Figures 1, 2 and 3 is used in securing an upholstered trim panel in place;

Figure 5 is a cross-sectional view taken on the plane indicated by the line 5—5 in Figure 4 looking in the direction of the arrows;

Figure 6 is a sectional view taken on the plane indicated by the line 6—6 in Figure 4 looking in the direction of the arrows;

Figure 7 is a side view of a modified form of wire fastener;

Figure 8:
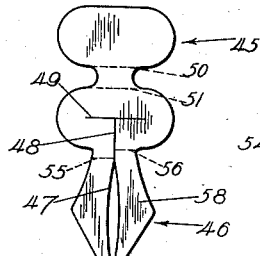
Figure 8 is a plan view of a blank from which a sheet metal fastener may be made having the characteristics of the fastener of the present invention.
Figure 9:
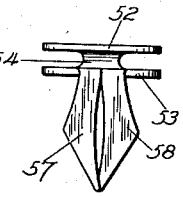
Figure 10:
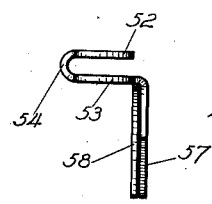
Figure 11:
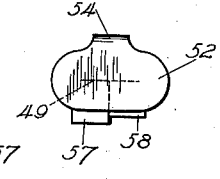
Figure 12:
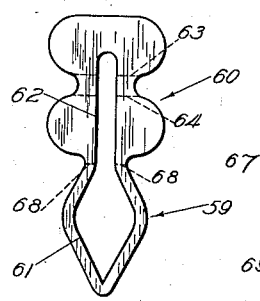
Figure 13:
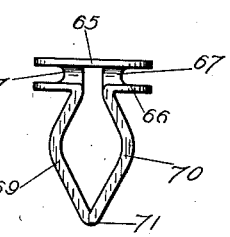
Figure 14:
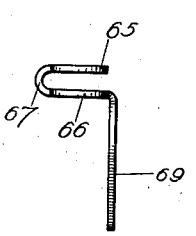
Figure 15:
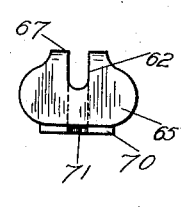
Figure 16:
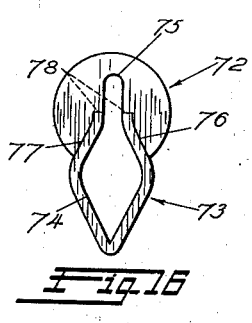
Figure 17:
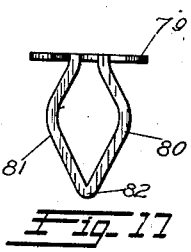
Figure 18:
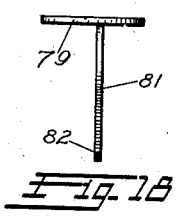
Figure 19:
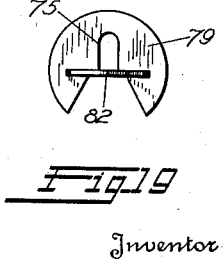

Figure 9, 10, and 11 are respectively side, edge and top plan views of the sheet metal fastener constructed from the blank of Figure 8;

Figure 12 is a plan view of a modified form of blank for a sheet metal fastener including the present invention;

Figures 13, 14 and 15 are respectively side, edge and top plan views of the sheet metal fastener constructed from the blank of Figure 12;

Figure 16 is a plan view of a further sheet metal blank from which a still further modified form of sheet metal fastener of the present invention may be made;

Figures 17, 18 and 19 are respectively side, edge and plan view of the sheet metal fastener constructed from the blank of Figure 16.

Like reference characters indicate like parts throughout the several figures.

Referring to Figures 1, 2 and 3, the illustrated fastener comprises a hook-like head part 20 and a stud part 21. The hook-like head part 20 includes arms 22 and 23 connected together by wire portions 24 spacing said arms apart. The outer arm 22 is formed from the mid-portion of a single piece of wire and consists of an elongated loop 25 preferably having semi-circular end portions 26 and 27, to which the respective connecting portions 24 are attached. The inner arm 23 of the head part consists of semi-circular portions 28 and 29 which preferably lie directly beneath the portions 26 and 27. The portions 28 and 29 carry the legs 30 and 31 which constitute the stud part of the fastener. Said legs are outwardly bowed between their ends in order to provide inclined holding shoulders extending divergently away from the head part and to provide guiding surfaces facilitating the entry of the stud part of the fastener in the aperture in the structure to which it is applied after the manner fully described in Patent No. 1,679,266, granted July 31, 1928. Preferably the legs 30 and 31 are formed from the end portions of said piece of wire, and they are disposed in overlapped relation so as to be capable of passing each other in scissors fashion at the end of the stud part remote from the head part.

The fastener just described, in addition to providing a hook formation between the arms 22 and 23, also presents oppositely opening pairs of jaws, one pair of jaws being formed by the semi-circular wire portions 26 and 28 and the other pair of jaws by the overlying semi-circular wire portions 27 and 29.

The manner in which the fastener of Figures 1, 2 and 3 is preferably used is illustrated in Figures 4, 5 and 6 in which 32 indicates the foundation of a trim panel, which is provided with an upholstering covering 33 lapping the edges of the foundation and turned into contact with the rear margins of the foundation at 34 in a manner well understood in the art. Before the upholstery material is applied to the foundation the latter is provided with a multiplicity of elongated slots 35 preferably of a size and shape just sufficient to permit the head part of the fastener already described to be passed through the slot from the uncovered side of the foundation after the panel has been completely constructed. This arrangement permits the fastener to be applied to the foundation by passing the head part through the opening and then turning it through an angle of ninety degrees to bring the portions of the foundation at each side of the elongated opening 35 between the two pairs of jaws provided, as already stated, between the semi-circular portion 26 and 28 on the one hand, and 27 and 29 on the other. The fastener is so designed that the space between said jaws is slightly less than the thickness of the foundation whereby when the fastener has been turned to its opposite position the foundation portions at opposite sides of the opening are firmly gripped between said jaws.

Referring particularly to Figure 4 it will be seen that after the fastener has been assembled in the manner stated it has a very wide range of adjustability along the length of the elongated slot without in any manner impairing the hold of the head part of the fastener on said foundation. The limit of the range of adjustability of the fastener toward the margin of the panel is indicated by a showing of the head part of the fastener in dotted line position at the right of said figure, the portion of the foundation adjacent the end of the slot being, in this position of adjustment of the fastener, gripped between the arms 22 and 23 forming the hook-like head part. Of course, if the fastener is shifted from the dotted line position toward the full line position, the portions of the foundation at the sides of the elongated slot are gripped between the jaws already referred to. Said jaws may be made of any length and width and accordingly a firm engagement between the head part of the fastener and the foundation is insured regardless of the position of adjustment of the fastener along the length of the slots.

In many installations, a wide adjustment of the fastener is necessary because the openings, such as the opening 36 in the supporting structure 37, may be located at different positions with respect to the margins of the supporting structure. By the present invention it is possible to shift the fastener to any necessary position to bring about registry between the stud part and the aperture 36 in the supporting structure.

It will be understood that the fasteners are assembled with respect to the foundation and that the trim panel is then applied to the structure by adjusting the fasteners individually as may be necessary to bring them into registry with the apertures in the supporting structure and the stud parts of the fasteners are then successively forced into said apertures in a manner now well understood in the art.

If desired, a fastener including the invention may be constructed from a single piece of wire in a manner illustrated in Figure 7 in which stud part 38 is made from the mid-portion of said piece of wire and includes two outwardly bowed legs 39 and 40 integrally connected at 41, or at the end of the stud part removed from the head part 42. Said head part is, in this form of the invention, made from the ends of the piece of wire which are bent to duplicate the head part already described, the ends of the wire 43 and 44 being preferably arranged at the center of the elongated loop constituting the outer arm of the head part as clearly illustrated in Figure 7. In this form of the invention the stud part of the fastener flexes at 41 whereas in that first described each leg places the portion of the head part to which it is connected under torsion.

Instead of constructing the fastener of a single piece of wire it may be made from sheet metal by punching a blank such as shown in Figure 8 from a metal sheet. Said blank comprises an H-shaped portion 45 and a diamond shaped portion 46, the stud part being formed from the latter portion while the head part is formed from the former. The diamond-like portion is separated by an incision such as 47 extending through the diamond-like portion into the H-shaped portion at 48 separating this end of the blank into two parts. Preferably a transverse incision 49 is also cut in the H-shaped portion of the blank.

In order to form the fastener, the blank just described is bent on the dotted lines 50 and 51 to provide a head part consisting of hook-like formation consisting of an outer arm 52 and an inner arm 53 connected together by a connecting portion 54. The blank is further bent on the dotted lines 55 and 56 to dispose the legs 57 and 58 in planes normal to the inner arm of the head portion. By bending the legs on the lines 55 and 56, which are offset with respect to each, the legs 57 and 58 will be arranged so as to be capable of passing each other in scissors fashion when the stud part of the fastener is passed through the aperture in the support. The sheet metal fastener just described is used in the manner already described with reference to the fastener of Figures 1, 2 and 3.

A further form of blank from which a fastener of the present invention may be constructed is illustrated in Figure 12 comprising a diamon-like portion 59 and an H-shaped portion 60. A diamond-like opening 61 is punched in the diamond-like portion 59 said opening extending into an elongated slot 62 projecting well into the H-shaped part 60.

In order to form the fastener of Figures 13, 14 and 15 from the blank of Figure 12, the part 60 is bent on the lines 63 and 64 to form a hook-like head comprising arms 65 and 66 disposed in superposed spaced relation and connected together by portions 67. The stud part is formed by bends made on the dotted lines 68 producing a stud part comprising two outwardly bowed legs 69 and 70 connected together at the end of the stud part at 71. A fastener of this form of the invention is used in the manner of that first described.

When the stud part of the fastener is contracted the flexure occurs principally at the point of connection 71 between them. While said legs can move towards each other adjacent the head part, inasmuch as they are separated at this point, it is necessary in so doing to place the portions of the head part under torsion. In this way stiffness is added to the stud part of the fastener and resilience provided in the fastener inasmuch as the parts placed under torsion have a natural tendency to return to their original condition which tendency is effective to contribute resilience to the stud part of the fastener.

A flat head fastener having a stud part functioning in the manner just described may be produced from the blank of Figure 16 consisting preferably of a circular part 72 and a diamond-like part 73. As in the form of the invention last described the diamond-like part 73 has the mid-portion thereof punched out as indicated at 74 by a cut preferably paralleling the external surfaces of the part 73. Preferably the opening 74 merges uninterruptedly in a slot 75 in the circular portion 72 of the blank. Incisions 76 and 77 serve to separate the portion of the blank which constitutes the stud part from the remainder which forms the head.

The fastener of Figures 17, 18 and 19 is formed from the blank of Figure 16 by simply bending the stud part at right angles to the head part on the dotted line 78 producing a flat head fastener having a head 79 in generally circular outline and a shank or stud part consisting of outwardly bowed legs 80 and 81 connected together at 82 at the end of the stud part remote from the head.

The fastener just described may be used in the manner of any flat head spring stud fastener. In operation it will be understood that, as stated with reference to the fastener of Figures 13, 14 and 15, when the shank is forced in the aperture, the legs move towards each other in the plane of the head bending at the connecting point 82. This places the portions of the head under torsion which provides substantial resilience and stiffness to the shank thereof that would not be inherent in the construction were the head part not an integral piece as in the fastener just described.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A spring stud fastener, comprising a head part consisting of two arms of substantially equal width connected together in superposed spaced relationship at one edge, said arms having a width substantially exceeding their length, one of said arms carrying the stud part of the fastener at its edge other than that connected to the overlying arm, the connection between said arms being centrally disposed between the ends of the arms and having a width less than the width of said arms whereby opposite ends of said arms provide two pairs of jaws having openings facing in opposite directions laterally of said stud part.

2. A one-piece wire spring stud fastener including a head part and a stud part, said head part comprising two spaced arms, the outer arm being in the form of an elongated open loop and the inner arm including substantially semi-circular wire portions connected to the ends of said open loop respectively, said arms being connected by wire portions that are closely spaced compared to the length of said elongated loop and said stud part including two outwardly bowed legs depending respectively from said last named portions.

3. A one-piece wire spring stud fastener, including a head part constructed from the mid-portion of the piece of wire and a shank part constructed from the remainder of said piece, said head part comprising two spaced arms providing a hook-like formation between them, the outer arm being in the form of an elongated open-loop having substantially semi-circular ends and the inner comprising substantially semi-circular portions disposed beneath said semi-circular ends and connected thereto respectively, by portions that are closely spaced compared to the length of said elongated loop and said stud part comprising two outwardly-bowed legs depending respectively from said semi-circular portions of the inner arm.

4. In combination, a trim panel including a foundation having an elongated slot formed therein, and a spring stud fastener having a head adjustable along the length of said slot, said head including portions yieldingly and firmly engaging both sides of said foundation over substantial areas at each side of said slot and a portion connecting said portions, said connecting portion being disposed in said slot.

5. In combination, a trim panel including a foundation having an elongated slot formed therein, said slot extending in a direction perpendicular to a margin of said foundation, and a fastener associated with said foundation through said slot and having a head of elongated form permitting passage through said slot in one position of said head from the uncovered side of said panel, said head in its operative position at right angles to said first-named position yieldingly and firmly engaging both sides of said foundation over substantial areas at each side of said slot, and having a portion disposed between the walls of said slot.

6. In combination, a supporting structure having an aperture for a fastener, a trim panel including a foundation having an elongated slot overlying said aperture and extending inwardly of the adjacent margin of said foundation, and a spring stud fastener having a stud part engaged in said aperture and a head part passed through said slot and adjustable therein endwise of the slot, said fastener having head portions engaging both sides of said foundation over substantial areas at each side of said slot, said portions being connected together by a further head portion offset from said stud part permitting said first named portions to be disposed over substantial areas between one end of said slot and said margin of the foundation.

7. In combination, a trim panel including a foundation having an elongated opening therein, and a fastener having a head part shaped to permit assembly in one position through said opening, said head in operative position comprising portions engaging both sides of said foundation at opposite sides of said opening and a portion disposed across said opening, said fastener being adjustable in said opening to vary the position of the shank thereof with respect to an adjacent margin of said foundation.

BION C. PLACE.